United States Patent [19]

Youden

[11] Patent Number: 4,998,957
[45] Date of Patent: Mar. 12, 1991

[54] DEVICE FOR MINIMIZING THE THERMAL SENSITIVITY OF A MACHINING APPARATUS

[75] Inventor: David H. Youden, Nelson, N.H.

[73] Assignee: Rank Taylor Hobson Inc., Keene, N.H.

[21] Appl. No.: 336,743

[22] Filed: Apr. 3, 1989

[51] Int. Cl.⁵ .............................................. B23B 3/00
[52] U.S. Cl. ...................................... 82/117; 82/142; 82/900
[58] Field of Search .................. 82/117, 118, 900, 142

[56] References Cited

U.S. PATENT DOCUMENTS

| | | |
|---|---|---|
| 3,043,056 | 7/1962 | Decker et al. |
| 3,236,124 | 2/1966 | Rhoades ................................ 82/900 |
| 3,427,906 | 2/1969 | Berly . |
| 3,554,064 | 1/1971 | Skillen ................................... 82/900 |
| 3,662,040 | 5/1972 | Urbach et al. |
| 3,772,829 | 11/1973 | Asano et al. |
| 3,877,177 | 4/1975 | Taniguchi . |
| 4,229,909 | 10/1980 | Dial, Sr. |
| 4,409,760 | 10/1983 | Nagaura . |
| 4,438,598 | 3/1984 | Wohlmuth . |

OTHER PUBLICATIONS

"Design of a New Error-Corrected Co-Ordinate Measuring Machine", J. B. Bryan and D. L. Carter, *Precision Engineering*, 0141-6359/70/030125-04, IPC Business Press.

Primary Examiner—Frederick R. Schmidt
Assistant Examiner—Lawrence Cruz
Attorney, Agent, or Firm—Lerner, David, Littenberg, Krumholz & Mentlik

[57] ABSTRACT

A device which substantially compensates for the expansion or contraction of a machining apparatus to varying temperatures in and among the components of the machining apparatus links two axes of movement of the machining apparatus by providing a measurement axis defined by the intersection of a first vertical plane passing through the cutting tip of a cutting tool and a second vertical plane passing through the workface of a workpiece to be machined, and associating one end of a temperature-insensitive member with this measurement axis, the other end of the temperature-insensitive member being in the same vertical plane as a reference point which remains stationary with respect to the measurement axis regardless of the thermal growth of the components of the machining apparatus.

78 Claims, 3 Drawing Sheets

DEVICE FOR MINIMIZING THE THERMAL SENSITIVITY OF A MACHINING APPARATUS

BACKGROUND OF THE INVENTION

The present invention relates generally to the precision machining of parts, and more particularly to a device which compensates for the thermal sensitivity of a precision machining apparatus to allow machining at higher levels of accuracy.

Reflective optics, infrared lenses and domes, spheric and aspheric lenses, fine ceramics, precision molds and other complex mechanical components are just examples of articles which, because of their specific applications and uses, require close tolerances in all dimensions. Therefore, the machining of such articles must be conducted on ultraprecision machining devices. Highly advanced multi-axis devices are commonly employed to machine such articles since they provide a very high degree of the requisite precision. These devices include lathes having a movable slide which carries a spindle and a slide which carries a toolholder for movement in a direction parallel to the longitudinal axis of the spindle. Single-crystal diamond, cubic boron nitride or carbide cutting tools are normally utilized to cut the workpiece mounted on the spindle. A single-crystal natural diamond cutting tool is preferred for removing materials such as non-ferrous metals, polymers and crystals because of its resistance to wear, the quality of its edge (which minimizes sub-surface stress and damage), its low coefficient of friction, chemical inertness, high thermal conductivity and low coefficient of thermal expansion. Lathes of this type are often referred to as diamond tool lathes and an article machined on a diamond tool lathe is said to have been diamond machined.

Those skilled in the art recognize that the machining of most symmetric and asymmetric components on a lathe requires the utmost precision in locating the center of the workpiece (which should be in the longitudinal axis of the spindle and chuck which holds the workpiece). Most applications of diamond tool lathes are in the field of optics where even a slight deviation from the center of the workpiece might render the component useless. Typically, numerically controlled lathes utilize resolvers, encoders, interferometers or linear scales to furnish position feedback information to the controller which positions the slides of the device. Such feedback information would be utilized to locate and continuously monitor the center of the workpiece being machined. In the production of symmetric and asymmetric components, the diamond cutting tool of the lathe would be moved from the perimeter of the component to the center of the workpiece as the workpiece is rotated by the spindle. Such sweeps of the tool against the workpiece would be made successively to remove material until the desired contour of the component was attained. It is imperative, therefore, that the exact center of the workpiece be located on each sweep.

Most prior art arrangements for locating the center of the workpiece are installed on diamond tool lathes without regard to the fluctuating temperature in the environment surrounding the lathe or the temperature of the lathe components themselves. It is appreciated, but not fully understood, that temperature has a significant influence on the accuracy of machining and measurement. The thermal growth of the lathe components occurs for several reasons including heat generated by motors, moving components, bearings and friction. Since many lathes are adapted to move distances of approximately 0.000,001 inches, any significant thermal expansion of the lathe components, such as the slides or the supporting structure for the slides, effects the accuracy of positioning the cutting tool or locating the center of the workpiece. Thus, as the lathe components expand due to a rise in temperature in and about the lathe components, the sweeps of the tool to cut the surface become successively less accurate.

The few attempts in the industry to compensate for the thermal sensitivity of ultra-precision machines such as diamond tool lathes have included the use of metrology frames. Metrology frames carry only position-sensing equipment and are built around the machine itself to isolate the position-sensing equipment from the load-carrying members of the machine so that the changing loads on the load-carrying members of the machine do not affect the position-sensing equipment and the position measurements. Typically, metrology frames employ laser interferometers or other feedback devices to furnish the requisite position information. This position information is obtained by measurements made behind and to the side of the workpiece and cutting tool. The points from which position measurements are to be made are chosen without regard to the workface of the workpiece or the tip of the cutting tool. Thus, the manner in which metrology frames "link" the two axes of a two-axis device takes into account only the center of the spindle and workpiece. With respect to thermal sensitivity, the servo motors, laser interferometer and other components of metrology frames are thermally isolated from the machine components in an attempt to reduce or eliminate position measuring error introduced by the thermal expansion of such machine components. Some metrology frames are made from alloys having relatively low coefficients of expansion in an attempt to minimize the effect of temperature changes. However, the cost of materials having low coefficients of expansion is high, therefore inhibiting their use in most commercial machines. Further, the advantages of using alloys having relatively low coefficients of thermal expansion is minimized because of the manner in which the metrology frame links the axes of ultra-precision machines. In prior art metrology frames, there is no attempt to make all displacement measurements from a common, specifically defined axis. Thus, the position information obtained from the measurements made on a metrology frame system is limited.

Experience has revealed that metrology frames can provide acceptable results in the initial stages of operation after the position-sensing equipment has been properly aligned and adjusted. However, once the components of the ultra-precision machine employing a metrology frame undergo a rise in temperature, the alignment and adjustment of the position-sensing equipment is detrimentally affected. Therefore, ultra-precision machines employing metrology frames must frequently, as much as two to three times in a day, be taken out of operation so that the position-sensing equipment can be realigned and readjusted with respect to the center of the workpiece. Further, the only way to adjust and align such a device (i.e., set to center) is by a trial and error technique. Specifically, such a technique would require one to make a cut on a mock workpiece, analyze the cut workpiece on an interferometer, adjust the device, and repeat these steps until the interferometer shows the device to be properly aligned to center. This, of course, is tedious, expensive and slows production of the article being manufactured. Other drawbacks of metrology frames include their expense, their intricate installation, and their bulky size.

The foregoing demonstrates that a device which substantially minimizes the thermal sensitivity of lathe components so that accurate position measurements can be readily taken throughout the machining of an article is warranted. Such a device should link the axes of a two-axis system to take into account the dimensions being measured with respect to the cutting tool and the workpiece and how such dimensions are being measured. It is also desirable that existing machinery could be easily modified with such a device.

SUMMARY OF THE INVENTION

The present invention specifically relates to a machining device which includes a first slide disposed on a base and being adapted to move a cutting tool along a first longitudinal axis, a second slide disposed on a slide support and being adapted to move a workpiece in a direction transverse to the first longitudinal axis such that the workface of the workpiece substantially faces the cutting tool, a vertical measurement axis defined by the intersection of a first imaginary vertical plane parallel to the first longitudinal axis and including the cutting tool tip and a second imaginary vertical plane parallel to the second slide and including the workface of the workpiece, a temperature-insensitive member having a first end and a second end and being disposed in parallel with the second slide so as to geometrically link the movement of the first slide with that of the second slide, the first end of the temperature-insensitive member being fixed to the base and disposed in the vertical measurement axis, the temperature-insensitive member being so constructed that it maintains a substantially constant length even during temperature variations in and around the machining device, and a vertical alignment mechanism connected to the second end of the temperature-insensitive member and connected to the slide support, the vertical alignment mechanism being constructed and arranged so that a fixed point on the vertical alignment mechanism is in the same vertical plane as the second end of the temperature-insensitive member. By reason of the relatively low coefficient of thermal expansion of the temperature-insensitive member and the geometrical link provided between the first slide and the second slide, the fixed point on the vertical alignment mechanism remains substantially stationary with respect to the first end of the temperature-insensitive member regardless of temperature variations in and among the machining device or the various parts thereof. Position feedback devices can be provided to continuously indicate the position of the cutting tool. Thus, when the workpiece and cutting tool are moved relative to one another so that the first imaginary vertical plane includes the center of the workpiece, the position feedback device will indicate zero radius, i.e., that the cutting tool is in the center of the workpiece. When machining spheric or aspheric surfaces in the conventional manner, a reading of zero radius will indicate the completion of one sweep across the workface of the workpiece. The position feedback device will continuously monitor the position of the cutting tool and, therefore, less conventional tool movements or sweeps (for instance, to a point other than the center of the workpiece) can also be accomplished quite accurately.

In another embodiment of the present invention, the first slide is adapted to move the workpiece along a first longitudinal axis and the second slide is adapted to move the cutting tool in a direction transverse to the first longitudinal axis such that the cutting tip of the cutting tool substantially faces the workpiece. In this case, the remaining structure remains substantially the same as in the first case, but the measurement axis is defined by the intersection of a first imaginary vertical plane parallel to the first longitudinal axis and including the centerline of the workpiece and a second imaginary vertical plane parallel to the second slide and including the cutting tip of the cutting tool.

It is also noted that the temperature-insensitive member in the present invention can be made of any common material so long as its length remains substantially the same throughout a number of machining processes.

Accordingly, it is the object of the present invention to provide a two-axis machining device which continuously compensates for the thermal expansion of its components, and thereby provides a greater degree of accuracy.

It is another object of the present invention to provide a two-axis machining device in which a temperature-insensitive member links the axis carrying the tool to the axis carrying the workpiece so as to provide compensation for the thermal growth of the various components of the machining device.

It is another object of the present invention to provide a two-axis machining device in which a measurement axis from which all measurements are to be referenced is chosen in relation to the workpiece so that compensation for the thermal growth of the tool-carrying axis slide is inherent.

It is another object of the present invention to provide a two-axis machining device which maintains a high degree of accuracy for a substantial amount of operating time, requiring only infrequent adjustment.

It is another object of the present invention to provide a device and system for minimizing the thermal sensitivity of machining devices, which device and system are adapted to be retrofit on existing machining devices.

The foregoing objects, as well as other objects relating to the inventive concepts underlying the present invention, can be accomplished by providing a machining device which comprises a base, a slide support on the base, a first slide on the base and adapted to move a first member along a first longitudinal axis, a second slide on the slide support and being adapted to move a second member in a direction transverse to the first longitudinal axis, the second member having an outermost surface for contact with the first member, a temperature-insensitive member having a first end and a second end and being disposed in parallel with the second slide, the first end of the temperature-insensitive member being connected to the base and disposed in an imaginary vertical measurement axis defined by the intersection of a first imaginary vertical plane passing through the first longitudinal axis and a second imaginary plane including the outermost surface of the second member, and a vertical alignment mechanism connected to the second end of the temperature-insensitive member and connected to the slide support, the vertical alignment mechanism being so constructed and arranged that a fixed point on the vertical alignment mechanism always remains stationary with respect to the second end of the temperature-insensitive member, and thus the measurement axis, when the components of the machining device expand or contract due to temperature variations.

BRIEF DESCRIPTION OF THE DRAWINGS

The above and other objects of the present invention will become apparent, as will a better understanding of the concepts underlying the present invention, by reference to the description which follows when taken in conjunction with the accompanying drawings in which.

DETAILED DESCRIPTION OF THE PREFERRED EMBODIMENT

Figure 1:
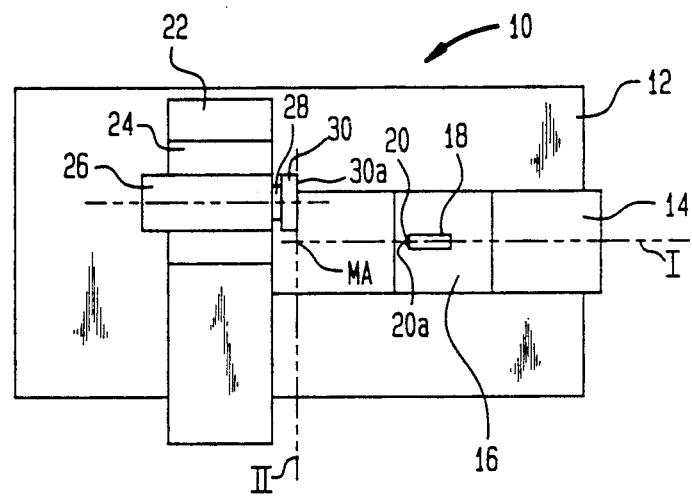
FIG. 1 is a top plan view of a machining device in accordance with the present invention, illustrating in particular the vertical measurement axis from which all measurements are referenced.
Figure 2:
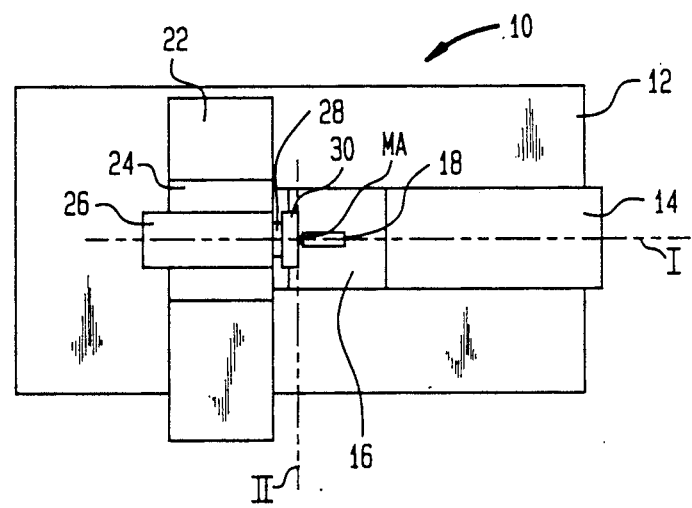
FIG. 2 is a top plan view of a machining device shown in FIG. 1 with the cutting tool in contact with the workpiece at zero radius thereon.

Referring to the figures, FIGS. 1 and 2, show a two-axis lathe, generally designated as 10 in accordance with the present invention, in plan view. Thus, the two-axis lathe 10 includes a base 12 on which a Z-axis slide support 14 is provided to carry the Z-axis slide 16. The Z-axis slide 16 supports a toolholder 18, which carries a cutting tool 20, for slidable movement along the longitudinal axis of the Z-axis slide. An X-axis slide support 22 is provided on the base 12 in perpendicular relation to the Z-axis slide 14. The X-axis slide support 22 carries the X-axis slide 24 for slidable movement perpendicular to the longitudinal axis of the Z-axis slide 16 (and thus the cutting tool 20). The X-axis slide 24 includes a spindle 26 which is adapted to rotate, for example, at approximately 400–7,200 revolutions per minute. The spindle 26 includes a chuck 28 for holding a workpiece 30 (for example, a lens blank when machining lenses) in position relative to the cutting tool 20, that is, with the workface 30a substantially perpendicular to the cutting tip 20a of the cutting tool 20. A single longitudinal axis, shown in phantom, is shared by spindle 26, the chuck 28 an the workpiece 30. Accordingly, when the cutting tip 20a of the cutting tool 20 (considered to be in the longitudinal axis of the cutting tool 20, the toolholder 18, and the Z-axis slide 16 for purposes of this description) is in the longitudinal axis of the workpiece 30, as shown in FIG. 2, the cutting tool 20 is said to be at zero radius.

More specifically with respect to the above-described components, the base 12 can be made of granite which is easily machined to provide a flat surface and has a relatively low coefficient of thermal expansion to alleviate the problems associated with fluctuations of temperature therein. The spindle 26 can be of the air bearing type having a liquid cooled, thermally insulated motor. The chuck 28 can be of the vacuum variety to hold the workpiece 30 in place for machining.

The two-axis lathe 10, as thus far described, can operate in the conventional manner to machine the workpiece 30 to the desired shape, size and contour. Very simply, this operation includes the positioning of the cutting tool 20 relative to the workpiece 30 such that the cutting tip 20a is in contact with workface 30a. As mentioned above, the machining of symmetrical and asymmetrical components, such as contact lenses, comprises successive sweeps across the workface 30a of the workpiece 30, each sweep removing more material from the workpiece 30 until the desired profile is attained. Typically, each sweep of the cutting tool 20 starts at the outer perimeter of the workpiece 30, continues radially across the workface 30a and stops at the center of the workpiece 30. It is readily apparent that the center of the workpiece 30 be accurately located and, more importantly, maintained throughout the machining operation so that successive sweeps of the cutting tool 20 always terminate at the exact center, or zero radius, of the workpiece 30. The zero radius position of the cutting tool 20 is illustrated in FIG. 2. Position feedback devices, discussed further below, provide the requisite measurement information as to the position of the cutting tip 30a relative to the workface 30a in the X and Z directions. However, these position feedback devices alone cannot compensate for the thermal sensitivity of the ultra precision lathe 10 in the X and Z directions.

It should also be noted that because of the manner in which components are typically machined, i.e., moving the cutting tip 20a radially and horizontally across the workface 30a, the thermal expansion of the lathe components in the Y or vertical direction is not as important as the thermal expansion in the X and Z directions in which the workpiece 30 and cutting tool 20 move, respectively. As a practical matter, the lathe components will not expand enough in the Y direction to detrimentally affect the machining process and/or the accuracy of the dimensions of a component machined on the lathe.

Accordingly, the present invention provides a system of linking the Z-axis slide to the X-axis slide to minimize any error which might otherwise be introduced into the machining process by reason of temperature variations in and among the various components of the lathe 10. Thus, one aspect of the inventive system relates to the arrangement of a measurement axis from which all measurements in the X and Z direction are referenced. This measurement axis, designated as MA in the drawings, is an imaginary vertical axis defined by the intersection of a first imaginary vertical plane, designated as I in FIG. 1 and including the cutting tip 20a, and a secondary imaginary vertical plane, designated as II in FIG. 1 and including the workface 30a. As shown in FIGS. 1 and 2, the first imaginary vertical plane I includes the longitudinal axis of the cutting tool 20, the toolholder 18 and the Z-axis slide 16. It is also noted that the second imaginary vertical plane II is parallel with the direction of movement of the X-axis slide 24. In accordance with this arrangement, the position of the cutting tip 20a in the Z direction and the X direction is always referenced to the measurement axis MA. Thus, in the Z direction, the amount of material of the workpiece 30 removed by the cutting tool 20 can be accurately monitored. In the X direction, the radial position of the cutting tip 20a on the workface 30a can also accurately monitored. To summarize, the position of the cutting tip 20a can be monitored so that varying amounts of material can be removed from different quadrants or portions of the workface 30a and at different radial points on the workface 30a.

It is imperative to note that choosing the measurement axis MA to be in the workface 30a of the workpiece 30 inherently compensates for the thermal expansion of the lathe components in the Z direction to thereby substantially minimize any error which might otherwise be introduced by reason of thermal expansion or contraction in the Z direction.

Figure 3:
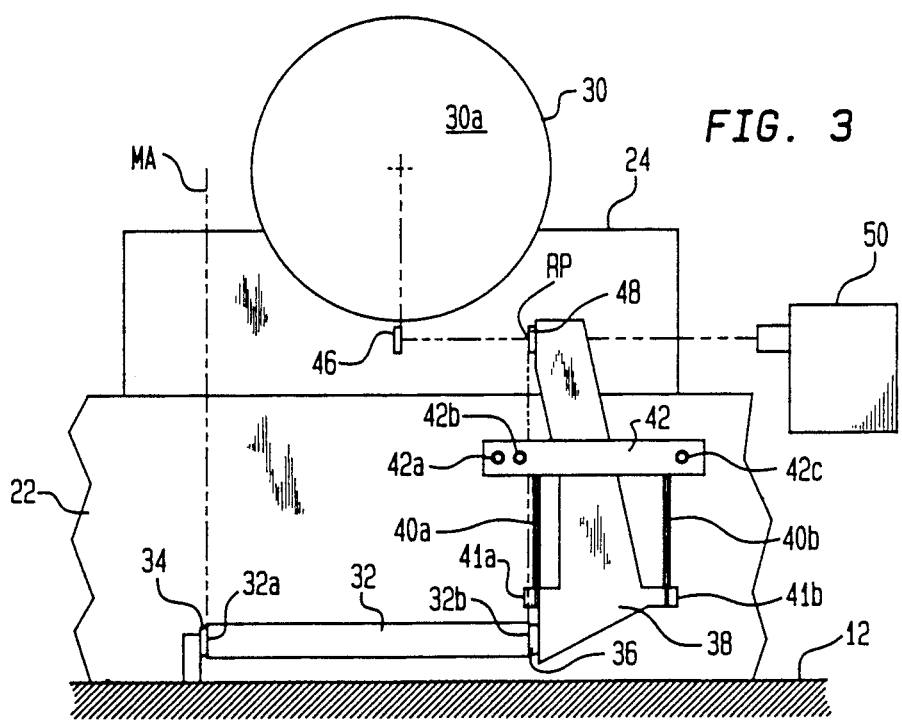
FIG. 3 is a front perspective of the X-axis slide, illustrating in particular the workpiece, the vertical alignment mechanism supported by the prestressed reed members, the temperature insensitive member held in compression by the reed members, and the X-axis interferometer cavity which is continuously measured for the positioning of the X-axis slide.
Figure 4:
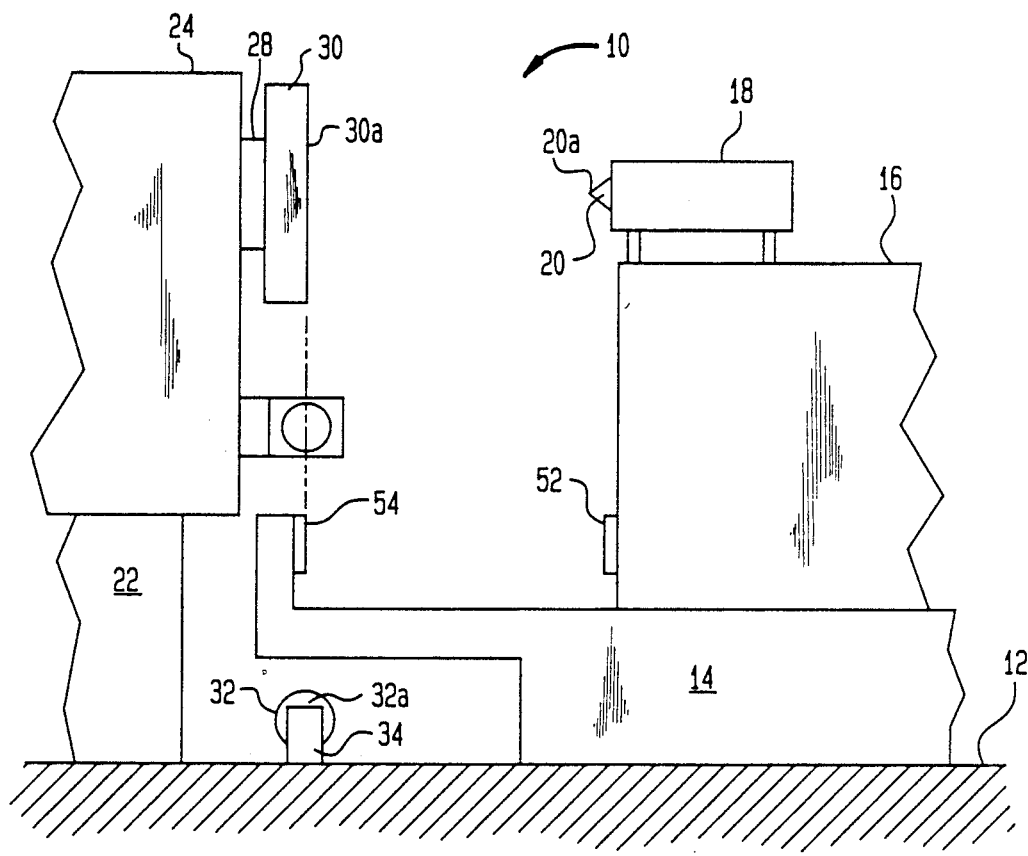
FIG. 4 is a partial side view of the Z-axis slide and the X-axis slide, illustrating in particular the Z-axis interferometer cavity, the relationship between the cutting tool and the workpiece, and the relationship between the temperature-insensitive member and the workface of the workpiece.
Figure 5:
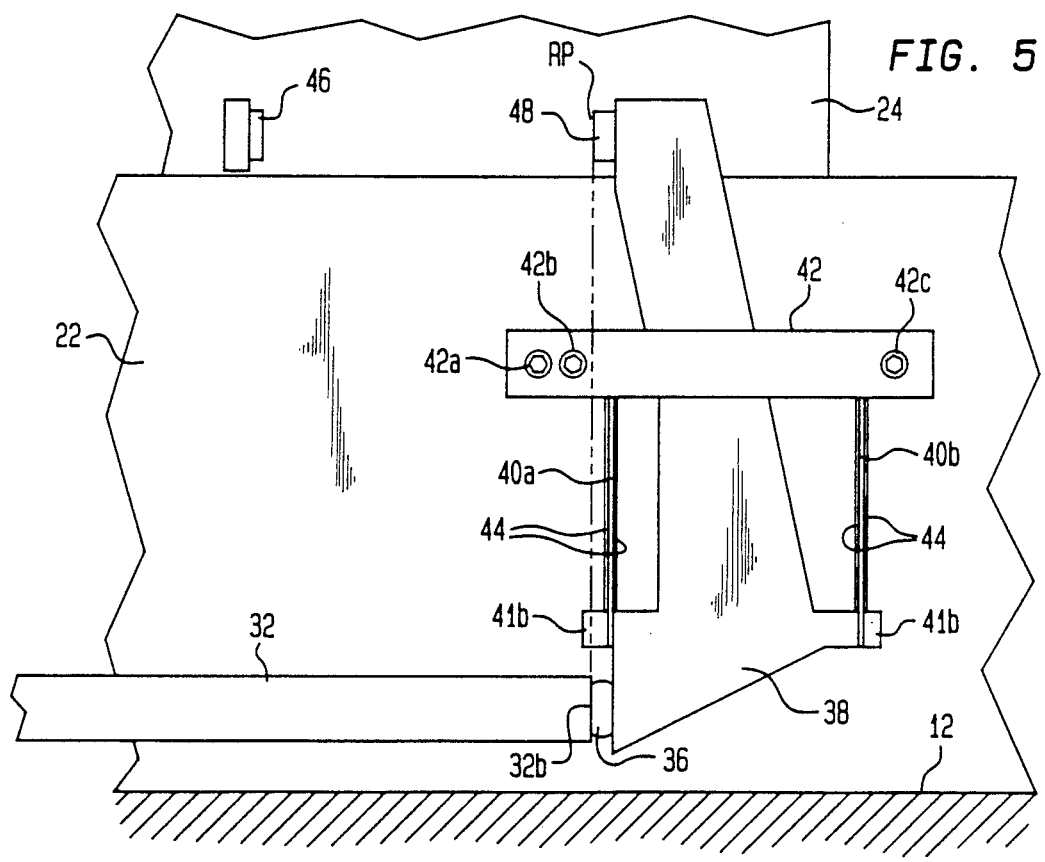
FIG. 5 is an enlarged view of the vertical alignment mechanism, illustrating in particular the arrangement of the prestressed reed members and the temperature-insensitive member.

A second aspect of the inventive system concerns the completion of the link, utilizing the measurement axis MA, between the Z-axis and the X-axis. In accordance with this aspect, a temperature-insensitive member 32, an elongated member shown in FIGS. 3, 4 and 5, is disposed below the slides 16 and 24 and adjacent to the base 12 in the second imaginary vertical plane. It should be noted that there could be a horizontal offset between the temperature-insensitive member 32 and the mirrors, as shown in FIG. 4. It is the positioning of the temperature-insensitive member 32, as will be explained below, which is important to this second aspect of the present invention.

For reasons which will become more apparent below, the temperature-insensitive member 32 must be constructed so that it maintains a substantially constant length regardless of temparature variations in and around the machining apparatus. Any means may be provided to accomplish this objective. For example, the temperature-insensitive member 32 could be made of any common material which is maintained at a constant temperature by any known means, such as by circulating temperature controlled water through it. In the preferred embodiment, however, the temperature-insensitive member 32 is made of a material having a relatively low coefficient of thermal expansion, at least as compared to the coefficients of thermal expansion of the various lathe components. Some glass compositions have been found to provide desirable results in this regard. An example of such a glass composition is ZERODUR (a trademark of Schott Glass) which, at room temperature, possesses a zero coefficient of expansion. Other materials, having low coefficients of thermal expansion and being suitable for the application of the temperature-insensitive member 32, include: INVAR (a trademark), a steel alloy containing approximately 36% nickel; and iron having a high nickel content.

The temperature-insensitive member 32 includes a first end 32a which is in the measurement axis MA. The first end 32a is connected to the granite base 12 by a first ball and socket arrangement 34, as shown in FIGS. 3 and 4. The temperature-insensitive member 32 extends across the granite base 12, at approximately one inch thereabove, where its second end 32b is connected, via a second ball and socket arrangement 36, to a vertical alignment mechanism 38 (where the socket portion of the second ball and socket arrangement 36 is formed in the vertical alignment mechanism 38 which is operatively associated with the X-axis slide support 22 as described below).

The vertical alignment mechanism 38 extends upwardly, from a point about one inch from the base 12, in juxtaposition with the X-axis slide support 22. At its upper end, the vertical alignment mechanism 38 includes a reference point RP, shown in FIGS. 3 and 5, which is aligned in the same vertical plane as the second end 32b of the temperature-insensitive member 32. It is intended that the reference point RP on the vertical alignment mechanism 38 remain in the same vertical plane as the second end 32b of the temperature-insensitive member 32 through a number of machining operations utilizing the lathe 10, regardless of the thermal growth of the lathe components. The temperature-insensitive member 32 plays an integral role in establishing the relationship between the reference point RP and the measurement axis MA which includes the second end 32b. This will be discussed further below.

It is noted that devices employing concepts similar to those employed with respect to vertical alignment mechanism 38 are well known to those skilled in the art. Some of the concepts underlying the structure and operation of such devices are described in *Parallel and Rectilinear Spring Movements*, an article which appeared in Volume 28 of The Journal of Scientific Instruments in February 1951.

Figure 6:
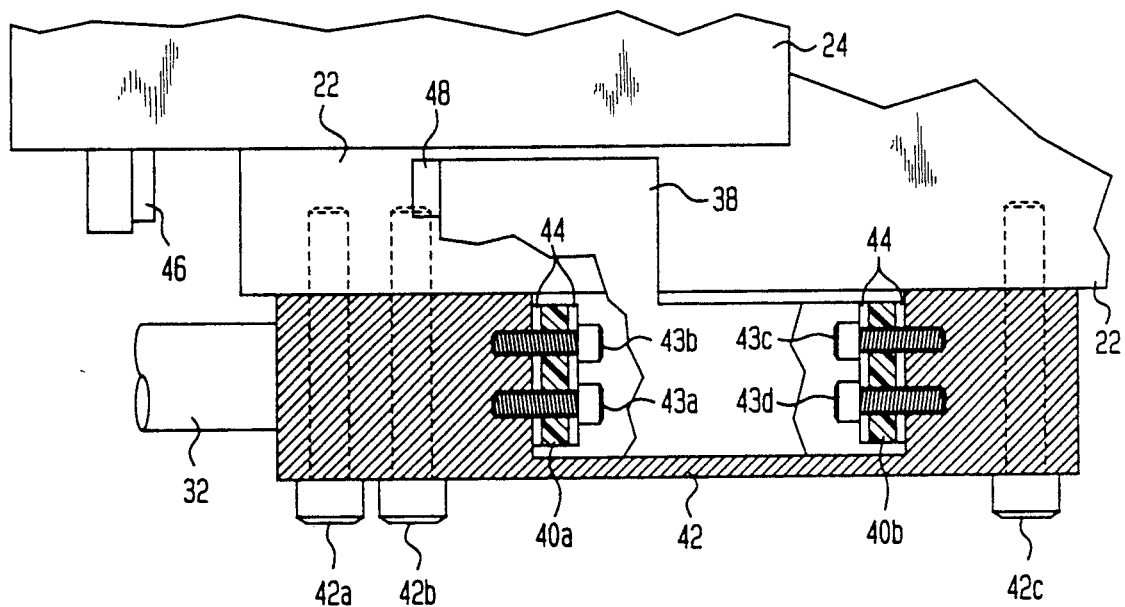
FIG. 6 is a top view of a portion the vertical alignment assembly shown in FIG. 5, illustrating in particular the connection of the prestressed reed members to the retaining member.

In the preferred embodiment of the present invention, the vertical alignment mechanism 38 extends from its lower portion, to which the temperature-insensitive member 32 is connected, at an angle towards the X-axis slide 24. Two reeds 40a and 40b, comprising elongated rectangularly shaped plate-like members, are provided to support the vertical alignment mechanism 38. The reeds 40a and 40b are fixed, by fasteners 43a, 43b, 43c and 43d, as shown in FIG. 6, to a retaining member 42 and extend downwardly to support the vertical alignment mechanism 38. The reeds 40a and 40b are fixed at their lower ends to the vertical alignment mechanism 38 by fasteners 41a and 41b, respectively. The retaining member 42 extends across the vertical alignment mechanism 38, and includes fasteners 42a, 42b and 42c to secure it to the X-axis slide support 22. The reeds 40a and 40b include vibration damping materials 44 on either side to minimize the effect of vibration on the reeds 40a and 40b and the vertical alignment mechanism 38 during operation of the lathe 10.

In accordance with the inventive principles underlying the present invention, the reeds 40a and 40b of the preferred embodiment are prestressed so as to load the temperature-insensitive member 32 in compression between the first ball and socket arrangement 34 and the second ball and socket arrangement 36. Thus, in effect, the reeds 40a and 40b collectively force the temperature-insensitive member 32 against the first ball and socket arrangement 34 which is fixed to the base 12. In this manner any thermal growth of the lathe components in the X direction, primarily the X-axis slide support, will tend to relax the reeds 40a and 40b, that is, the top of the reeds 40a and 40b will move with the retaining member 42. Thus, the reeds 40a and 40b will essentially pivot about their fastened lower ends such that the reeds 40a and 40b are maintained in substantial parallelism with one another. In this manner, the reference point RP will remain in vertical alignment with the second end 32b of the temperature-insensitive member 32. Since the temperature-insensitive member 32 is made from a material having a substantially low coefficient of thermal expansion, it will not, for all intents and purposes of a precision machining process, expand in length. Thus, the reference point RP will not only remain in the same vertical plane as the second end 32b, but will also remain in the same position relative to the measurement axis MA which includes the first end 32a of the temperature-insensitive member 32.

As mentioned above, position measuring devices are used to locate and continuously monitor the position of the workpiece 30 and the cutting tool 20. While any means can be utilized to provide the requisite measurements in the X and Z directions, the preferred embodiment of the present invention employs differential plane mirror interferometers for position measurement. Such interferometers are merely feedback sensors which measure the distance between two points by generating a laser beam therebetween.

Referring to FIGS. 3 and 5, the lathe 10 includes an X-axis moving mirror 46 positioned on the X-axis slide 24 in the same vertical plane as the longitudinal axis of the spindle 26, which longitudinal axis includes the center of the workpiece 30. An X-axis stationary mirror 48 is fixed to the upper portion of the vertical alignment mechanism 38 and includes the reference point RP. While there may be some vertical movement and horizontal movement (parallel to the first longitudinal axis) of the X-axis stationary mirror 48 due to thermal expansion of the vertical alignment mechanism 38, this movement is considered to be insignificant because it occurs in a plane perpendicular to the axis along which the measurement is made in the X direction, i.e., along the path of the laser beam, between the X-axis stationary mirror 48 and the X-axis moving mirror 46. Thus, such movement will not affect the measurement between the X-axis stationary mirror 48 and the X-axis moving mirror 46.

As shown in FIG. 3, an X-axis laser interferometer 50 is provided to generate a laser beam through the X-axis stationary mirror 48 and to the X-axis moving mirror 46 whereupon the laser beam is reflected back to the X-axis stationary mirror 48. Of course, the upper portion of the vertical alignment mechanism 38 and the X-axis stationary member 48 provide an opening or other means through which the laser beam from the laser interferometer 50 can pass. Using this technique, the distance in the X-axis interferometer cavity, i.e., the distance between the X-axis moving mirror 46 and the X-axis stationary mirror 48 is accurately measured. Because the reference point RP always remains stationary with respect to the measurement axis MA, the measurement between the X-axis moving mirror 46 and the X-axis stationary mirror 48 is easily translated so that such measurement is referenced from the measurement axis MA. Thus, since the X-axis moving mirror 46 is in line with the center of the workpiece 30, the information provided by the X-axis laser interferometer 50 can be used to position the cutting tool 20 at the center or any radial position on the workface 30a of the workpiece 30.

With regard to the Z direction, or the movement of the cutting tool 20 on the Z axis slide 16, a Z-axis moving mirror 52 is provided on the front face of the Z-axis slide 16, as shown in FIG. 4. A Z-axis stationary mirror 54 is provided on an extension of the Z-axis slide support 14 to define the Z-axis interferometer cavity with the Z-axis moving mirror 52. It is important to note that the Z-axis stationary mirror 54 is in the second imaginary vertical plane II which, as stated above, includes the workface 30a of the workpiece 30. A Z-axis laser interferometer (not shown) operates in the same manner as the X-axis laser interferometer 50 to measure the distance between the Z-axis moving mirror 52 and the Z-axis stationary mirror 54. This information is, of course, provided to a computer for processing together with the information provided by the X-axis laser interferometer 50. Thus, the depth to which the cutting tool 20 is permitted to machine the workpiece 30 can be continuously and accurately monitored. The information from the interferometers can also be processed with information provided by another sensor to monitor the angular position of the workpiece. With this exchange of information, the computer can move the cutting tool to any desired machining position.

Figure 7:
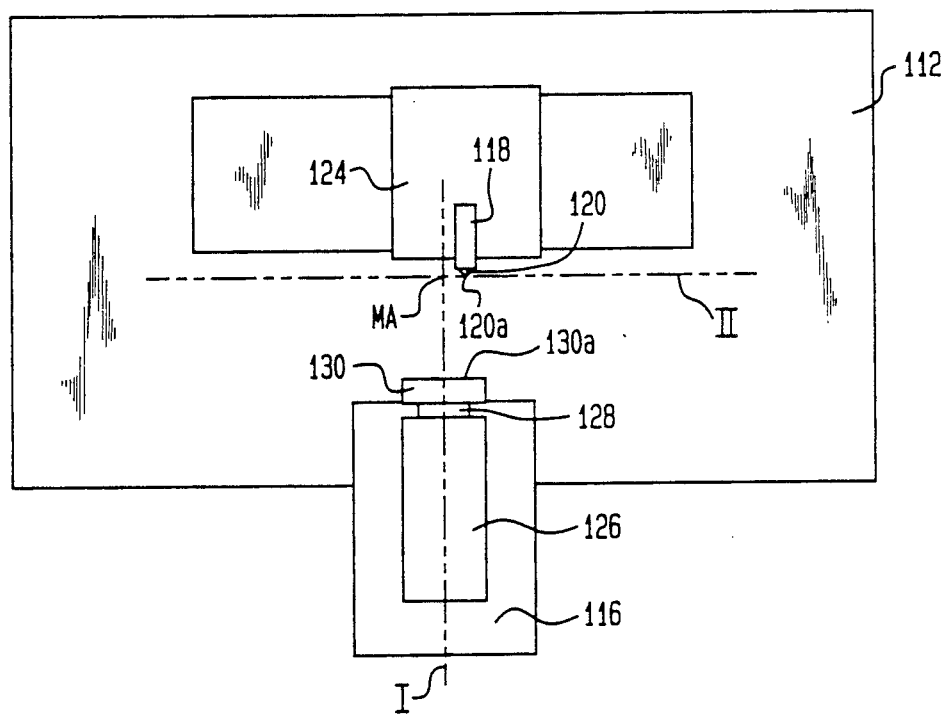
FIG. 7 is a top plan view of a machining device in accordance with another embodiment of the present invention, illustrating in particular the vertical measurement axis from which all measurements are referenced.

Another embodiment of the present invention is shown in FIG. 7. This embodiment differs from the above-described embodiment in that it reverses the slides on which the cutting tool and the workpiece are provided. Thus, spindle 126, chuck 128 and workpiece 130 are provided on Z-axis slide 116 for movement along a first longitudinal axis which passes through the center of the spindle 126, chuck 128 and workpiece 30. The toolholder 118 and cutting tool 120 are mounted on the X-axis slide 124, which is on the base 112, for movement transverse to the workface 130a of the workpiece 130. With this modified arrangement, the only feature of the above-described embodiment which needs to be altered is the definition of the measurement axis MA. The first imaginary vertical plane I in this embodiment includes the center of the workpiece 130 and the second imaginary vertical plane II includes the cutting tip 120a of the cutting tool 120. The remaining structure and the operation of this embodiment is the same as in the above-described embodiment with measurements being referenced from the newly defined measurement axis MA.

Thus, a device for minimizing the thermal sensitivity of an ultra-precision machining apparatus has been described. The device is easy to construct and can be retrofit on existing machinery to reduce the frequency in which the machining apparatus needs to be readjusted and realigned. With the arrangement of the present invention, such readjustment and realignment need only be undertaken about once a month or less.

It should be recognized that the means by which a reference point RA remains in the same vertical plane as the second end 32b of the temperature-insensitive member 32 during thermal growth of the lathe components is not limited to loading the temperature-insensitive member 32 in compression. Rather, it is only important that the reference point RP remain stationary with respect to the measurement axis MA. Further, the means by which the position or measurement information is provided and processed is similarly not limited to that which has been disclosed herein.

Thus, while the foregoing description and figures illustrate one preferred embodiment of the device for minimizing the thermal sensitivity of machining apparatus in accordance with the present invention, it should be appreciated that certain modifications could be made and are encouraged to be made in the materials and techniques of the disclosed embodiment without departing from the spirit and scope of the present invention which is intended to be captured by the claims set forth immediately below.

What is claimed is:

1. A machining device for the precision machining of a workpiece, said machining device comprising:
   (a.) a base;
   (b.) a slide support on said base;
   (c.) a first slide on said base, said first slide being adapted to move a cutting tool along a first longitudinal axis;
   (d.) a second slide on said slide support, said second slide being adapted to move a workpiece having a workface in a direction transverse to said first longitudinal axis, said first slide and said second slide being movable relative to one another so that the cutting tool contacts the workface of the workpiece;
   (e.) a measurement axis defined by the intersection of a first imaginary plane passing through said first longitudinal axis and a second imaginary plane which includes the workface of the workpiece;
   (f.) a temperature-insensitive member having a first end and a second end and being disposed in said second imaginary plane, said first end being connected to said base and disposed in said measurement axis, said temperature-insensitive member being so constructed that it maintains a substantially constant length during operation of the machining device even when the temperature in and around the machining device fluctuates; and
   (g.) an alignment mechanism connected to said second end of said temperature-insensitive member and connected to said slide support, said alignment mechanism having a fixed point in an imaginary alignment plane extending from and including said second end of said temperature-insensitive member, said alignment mechanism being so constructed and arranged with respect to said temperature-insensitive member and said slide support that said fixed point remains stationary with respect to said measurement axis when the machining device or parts thereof expand or contract due to temperature variations.

2. The machining device in claim 1, wherein the temperature-insensitive member is horizontal, said measurement axis is vertical and the direction in which the second slide is movable is perpendicular to said first longitudinal axis.

3. The machining device in claim 1, wherein said first imaginary plane includes said first longitudinal axis.

4. The machining device in claim 1, including means for measuring the distance between the fixed point on said alignment mechanism and the center of the workpiece.

5. The machining device in claim 4, including means for measuring the distance between the cutting tool and the workpiece.

6. The machining device in claim 1, wherein said imaginary alignment plane is substantially parallel to said first longitudinal axis.

7. The machining device in claim 1, wherein said temperature-insensitive member is made of a material having a coefficient of thermal expansion less than that of the material of which said slide support is made.

8. The machining device in claim 7, wherein said temperature-insensitive member is made of ZERODUR.

9. The machining device in claim 7, wherein said temperature-insensitive member is made of a composition of glass.

10. The machining device in claim 7, wherein said temperature-insensitive member is loaded in compression by said alignment mechanism.

11. The machining device in claim 7, wherein said temperature-insensitive member is made of a composition of glass.

12. The machining device of claim 7, wherein said temperature-insensitive member is horizontal and disposed below said first slide and said second slide.

13. The machining device in claim 1, wherein said temperature-insensitive member is loaded in compression by said alignment mechanism.

14. The machining device in claim 9, wherein said temperature-insensitive member is made of ZERODUR.

15. The machining device in claim 10, wherein said first end of said temperature-insensitive member is connected to said base by a first ball and socket arrangement and said second end of said temperature-insensitive member is connected to said alignment mechanism by a second ball and socket arrangement.

16. The machining device in claim 12, wherein said temperature-insensitive member is loaded in compression by said alignment mechanism.

17. The machining device in claim 13, including at least one reed member for connecting said alignment mechanism to said slide support, said reed member being prestressed and operatively associated with said temperature-insensitive member so that said reed member normally exerts a force against said temperature-insensitive member in the direction towards the connection between said temperature-insensitive member and said base.

18. The machining device in claim 17, wherein said first end of said temperature-insensitive member is connected to said base by a first ball and socket arrangement and said second end of said temperature-insensitive member is connected to said alignment mechanism by a second ball and socket arrangement.

19. The machining device in claim 17, wherein said reed members include vibration damping means.

20. The machining device in claim 17, including a retaining member connected to said slide support for maintaining said alignment mechanism in juxtaposition with said slide support and for connecting said at least one reed member to said slide support.

21. The machining device in claim 20, including means for measuring the distance between the fixed point on said alignment mechanism and the center of the workpiece.

22. The machining device in claim 21, including means for measuring the distance between the cutting tool and the workpiece.

23. The machining device in claim 16, including at least one reed member for connecting said alignment mechanism to said slide support, said at least one reed member being prestressed and operatively associated with said temperature-insensitive member so that said reed member normally exerts a force against said temperature-insensitive member in the direction towards the connection between said temperature-insensitive member and said base.

24. The machining device in claim 23, including retaining means for connecting said at least one reed member to said slide support and for maintaining said alignment mechanism in juxtaposition with said slide support.

25. The machining device in claim 24, wherein said temperature-insensitive member is connected to said base by a first ball and socket arrangement and to said alignment mechanism by a second ball and socket arrangement.

26. A machining device for precision machining, said machining device comprising:
(a.) a base;
(b.) a slide support on said base;
(c.) a first slide on said base, said first slide being adapted to move a first member along a first longitudinal axis;
(d.) a second slide on said slide support, said second slide being adapted to move a second member having an outermost surface in a direction transverse to said first longitudinal axis, said first slide and second slide being movable relative to one another so that the first member contacts the outermost surface of the second member;
(e.) a measurement axis defined by the intersection of a first imaginary plane passing through said first longitudinal axis and a second imaginary plane which includes the outermost surface of the second member;
(f.) a temperature-insensitive member having a first end and a second end and being disposed in said second imaginary plane, said first end being connected to said base and disposed in said measurement axis, said temperature-insensitive member being so constructed that it maintains a substantially constant length during operation of the machining device even when the temperature in and around the machining device fluctuates; and
(g.) a reference member connected to said second end of said temperature-insensitive member and connected to said slide support, said reference member having a fixed point in an imaginary alignment plane extending from and including said second end of said temperature-insensitive member, said reference member being so constructed and arranged with respect to said temperature-insensitive member and said slide support that said fixed point remains stationary with respect to said measurement axis when the machining device, or parts thereof, expand or contract due to temperature variations.

27. The machining device in claim 26, wherein said first imaginary plane includes said first longitudinal axis.

28. The machining device in claim 26, wherein said imaginary alignment plane is substantially parallel to said first longitudinal axis.

29. The machine device in claim 26, further comprising the first member and the second member and wherein the first member is a cutting tool, the second member is a workpiece, and the outermost surface is a workface of the workpiece.

30. The machining device in claim 26, further comprising the first mamber and the second member, and wherein the first member is a workpiece, the second member is a cutting tool, and the outermost surface is the cutting tip of the cutting tool.

31. The machining device in claim 29, wherein said temperature-insensitive member is made of a material having a coefficient of thermal expansion less than that of the material of which said slide support is made.

32. The machining device in claim 30, wherein said temperature-insensitive mamber is made of a material having a coefficient of thermal expansion less than that of the material of which said slide support is made.

33. A machining device for the precision machining of a workpiece, said machining device comprising:
(a.) a base;
(b.) a slide support on said base;
(c.) a first slide on said base, said first slide being adapted to move a cutting tool along a first longitudinal axis;
(d.) a second slide on said slide support, said second slide being adapted to move a workpiece having a workface in a direction transverse to said first longitudinal axis, said first slide and second slide being movable relative to one another so that the cutting tool contacts the workface of the workpiece;
(e.) a measurement axis defined by the intersection of the first imaginary plane passing through said first longitudinal axis and a second imaginary plane which includes the workface of the workpiece;
(f.) a temperature-insensitive member having a first end and a second end and being disposed in said second imaginary plane, said temperature-insensitive member being made of a material having a coefficient of thermal expansion less than that of the material of which said slide support is made, said first end being disposed in said measurement axis and being connected to said base by a first ball and socket arrangement, said temperature-insensitive member being so constructed that it maintains a substantially constant length during operation of the machining device even when the temperature in and around the machining device fluctuates; and
(g.) an alignment mechanism connected to said slide support and connected to said second end of second end of said temperature-insensitive member by a second ball and socket arrangement such that said temperature-insensitive member is loaded in compression by said alignment mechanism, said alignment mechanism having a fixed point in an imaginary alignment plane extending from and including said second end of said temperature-insensitive member, said alignment mechanism being so constructed and arranged with respect to said temperature-insensitive member and said slide support that said fixed point remains stationary with respect to said measurement axis when the machining device or parts thereof expand or contract due to temperature variations.

34. The machining device in claim 33, wherein said first imaginary plane includes said first longitudinal axis.

35. The machining device in claim 33, wherein the temperature-insensitive member is horizontal, the measurement axis is vertical and the direction in which the second slide is moveable is perpendicular to said first longitudinal axis.

36. The machining device in claim 33, including means for measuring the distance between the fixed point of said alignment mechanism and the center of the workpiece.

37. The machining device in claim 33, wherein said imaginary alignment plane is substantially parallel to said first longitudinal axis.

38. The machining device in claim 33, wherein said temperature-insensitive member is made of a composition of glass.

39. The machining device in claim 33, including at least one reed member for connecting said alignment mechanism to said slide support, said at least one reed member being prestressed and operatively associated with said temperature-insensitive member so that said reed member normally exerts a force against said temperature-insensitive member in the direction towards the connection between said temperature-insensitive member and said base.

40. The machining device in claim 38, wherein said temperature-insensitive member is made of ZERO-DUR.

41. The machining device in claim 39, including retaining means for connecting said at least one reed member to said slide support and for maintaining said alignment mechanism in juxtaposition with said slide support.

42. A machining device for precision machining, said machining device comprising:
   (a.) a base;
   (b.) support means on said base;
   (c.) a temperature-insensitive member having a first end and a second end, said first end being connected to said base, said temperature-insensitive member being so constructed that it maintains a substantially constant length during operation of the machining device even when the temperature in and around the machining device fluctuates;
   (d.) an alignment mechanism connected to said support means and connected to said second end of said temperature-insensitive member, said alignment mechanism having a fixed point in an imaginary alignment plane extending from and including said second end of said temperature-insensitive member and extends towards said fixed point, said alignment mechanism being so constructed and arranged with respect to said temperature-insensitive member and said slide support that said fixed point remains stationary with respect to said second end of said temperature-insensitive member when the machining device, or parts thereof, expand or contract due to temperature variations;
   (e.) a first slide on said base, said first slide being adapted to move a first member along a first longitudinal axis;
   (f.) a second slide on said support means, said second slide being adapted to move a second member having an outermost surface in a direction transverse to said first longitudinal axis, said first slide and said second slide being movable relative to one another so that the first member can contact the outermost surface of the second member; and
   (g.) a measurement axis disposed in perpendicular relation to said temperature-insensitive member and being defined by the intersection of a first imaginary plane passing through said first longitudinal axis and a second imaginary plane which includes the outermost surface of the second member such that said measurement axis includes said second end of said temperature-insensitive member.

43. The machining device in claim 42, further comprising the first member and second member, and wherein said first member is a workpiece, said second member is a cutting tool, and said outermost surface is a workface of said workpiece.

44. The machining device in claim 42, further comprising the first member and the second member, and wherein said first member is a workpiece, said second member is a cutting tool, and said outermost surface is the cutting tip of said cutting tool.

45. The machining device in claim 42, wherein said imaginary alignment plane is substantially parallel to said first longitudinal axis.

46. The machining device in claim 42, wherein said first imaginary plane includes said first longitudinal axis.

47. The machining device in claim 43, wherein said temperature-insensitive member is made of a material having a coefficient of expansion which is less than that of the material of which said slide support is made.

48. The machining device in claim 44, further comprising the first member and the second member, and wherein said first member is a workpiece, said second member is a cutting tool, and said outermost surface is the cutting tip of said cutting tool.

49. The machining device for the precision machining of a workpiece, said machining device comprising:
   (a.) a base;
   (b.) a slide support on said base;
   (c.) a first slide on said base, said first slide being adapted to move a cutting tool along a first longitudinal axis;
   (d.) a second slide on said slide support, said second slide being adapted to move a workpiece having a workface in a direction transverse to said first longitudinal axis, said first slide and second slide being movable relative to one another so that the cutting tool contacts the workface of the workpiece;
   (e.) a measurement axis defined by the intersection of the first imaginary plane passing through said first longitudinal axis and a second imaginary plane which includes the workface of the workpiece;
   (f.) a temperature-insensitive member having a first end and a second end and being disposed in said second imaginary plane, said temperature-insensitive member being made of a material having a coefficient of thermal expansion less than that of the material of which said slide support is made, said first end being disposed in said measurement axis and being connected to said base by a first ball and socket arrangement, said temperature-insensitive member being so constructed that it maintains a substantially constant length during operation of the machining device even when the temperature in and around the machining device fluctuates;
   (g.) an alignment mechanism connected to said slide support and connected to said second end of said temperature-insensitive member by a second ball and socket arrangement such that said temperature-insensitive member is loaded in compression by said alignment mechanism, said alignment mechanism having a fixed point in an imaginary alignment plane extending from and including said second end of said temperature-insensitive member; and
   (h.) at least one reed member for connecting said alignment mechanism to said slide support, said reed member being prestressed and operatively associated with said temperature-insensitive member so that said reed member normally exerts a force against said temperature-insensitive member in the direction towards the connection between said temperature-insensitive member and said base, said alignment mechanism being so constructed and arranged with respect to said temperature-insensitive member and said slide support that said fixed point remains stationary with respect to said measurement axis when the machining device or parts thereof expand or contract due to temperature variations.

50. The machining device in claim 49, wherein said temperature-insensitive member is made of a material having a coefficient of thermal expansion less than that of the material of which said slide support is made.

51. The machining device in claim 49, wherein said temperature-insensitive member is made of a composition of glass.

52. The machining device in claim 49, including retaining means for connecting said at least one reed member to said slide support and for maintaining said alignment mechanism in juxtaposition with said slide support.

53. The machining device in claim 49, wherein said temperature-insensitive member is horizontal, said measurement axis is vertical and the direction in which the second slide is movable and perpendicular to said first longitudinal axis.

54. The machining device in claim 49, wherein said imaginary alignment plane is substantially parallel to said first longitudinal axis.

55. The machining device in claim 49, including means for measuring the distance between the fixed point on said alignment mechanism and the center of the workpiece.

56. The machining device in claim 49, wherein said first imaginary plane includes said first longitudinal axis.

57. The machining device in claim 51, wherein said temperature-insensitive member is made of ZERO-DUR.

58. The machining device in claim 54, including means for measuring the distance between the cutting tool and the workpiece.

59. The machining device in claim 55, including means for measuring the distance between the cutting tool and the workpiece.

60. A device to facilitate accurate and precise measurement between at least two members or points relative to such members, said device comprising:
    (a.) a slide support;
    (b.) mounting means for holding a first member having a first axis, said mounting means being adjacent said slide support;
    (c.) a slide on said slide support, said slide being adapted to move a second member having an outermost surface in a direction transverse to the first axis such that the outermost surface of the second member can be arranged in different positions relative to the first member held by said mounting means;
    (d.) a measurement axis defined by the intersection of a first imaginary plane passing through said first axis and a second imaginary plane which includes the outermost surface of the second member;
    (f.) a temperature-insensitive member having a first end and a second end and being disposed in said second imaginary plane, said first end being disposed in said measurement axis and being fixed with respect to but not fixed to said slide support, said temperature-insensitive member being so constructed that is maintains a substantially constant length even when the temperature in and around the device fluctuates; and
    (g.) a reference member connected to said second end of said temperature-insensitive member and connected to said slide support, said reference member having a fixed point in an imaginary reference plane extending from and including said second end of said temperature-insensitive member, said reference member being so constructed and arranged with respect to said temperature-insensitive member and said slide support that said fixed point remains stationary with respect to said measurement axis even when the device, or parts thereof, expand or contract due to temperature variations.

61. The device in claim 60, wherein said temperature-insensitive member is made of a material having a coefficient of expansion which is less than that of the material of which said slide support is made.

62. The device in claim 60, wherein the temperature-insensitive member is horizontal, said measurement axis is vertical and the direction in which the slide is movable is perpendicular to said first axis.

63. The device in claim 62, wherein said first imaginary plane includes said first axis.

64. The device in claim 63, wherein said second imaginary plane is substantially parallel with the direction of movement of the second member as moved by said slide.

65. The device in claim 64, wherein said imaginary reference plane is substantially parallel to said first axis.

66. The device in claim 64, further comprising the first member and the second member, and wherein said first member is movable along said first axis.

67. The device in claim 64, including means for measuring the distance between the fixed point on said alignment mechanism and the second member or points relative thereto.

68. The device in claim 66, including means for measuring the distance between the fixed point on said reference member and said second member or points relative thereto.

69. The device in claim 68, including means for measuring the distance between the first member and the second member or points relative thereto.

70. The device in claim 67, including means for measuring the distance between the first member and the second member or points relative thereto.

71. The device in claim 60, including a member which is fixed with respect to said slide support, and wherein said temperature-insensitive member is connected to said member by a first ball and socket arrangement to said alignment mechanism by a second ball and socket arrangement.

72. The device in claim 71, wherein said member is a base and said slide support and said mounting means are on said base.

73. The device in claim 72, including at least one reed member for connecting said alignment mechanism to said slide support, said reed member being prestressed and operatively associated with said temperature-insensitive member so that said reed member normally exerts a force against said temperature-insensitive member in the direction towards the connection between said temperature-insensitive member and said base.

74. The device in claim 73, wherein said reed members include vibration damping means.

75. The device in claim 73, including a retaining member connected to said slide support for maintaining said reference member in juxtaposition with said slide support and for connecting said at least one reed member to said slide support.

76. The device in claim 74, wherein said temperature-insensitive member is made of a material having a coefficient of thermal expansion less than that of the material of which said slide support is made.

77. The device in claim 76, wherein said temperature-insensitive member is made of a composition of glass.

78. The device in claim 77, wherein said temperature-insensitive member is made of ZERODUR.

* * * * *

UNITED STATES PATENT AND TRADEMARK OFFICE
CERTIFICATE OF CORRECTION

PATENT NO. : 4,998,957
DATED : March 12, 1991
INVENTOR(S) : David H. Youden

It is certified that error appears in the above-identified patent and that said Letters Patent is hereby corrected as shown below:

Column 5, Line 67, "an" should read --and--

Column 7, Line 11, after "can also" insert --be--

Column 10, Line 51, "RA" should read --RP--

Column 13, Line 61, "mamber" should read --member--

Column 14, Line 2, "mamber" should read --member--

Column 15, Line 63, after the first occurrence of "and" insert --the--

Column 17, Line 64, "is" should read --it--

Signed and Sealed this

First Day of September, 1992

Attest:

DOUGLAS B. COMER

Attesting Officer

Acting Commissioner of Patents and Trademarks